United States Patent
Grasso et al.

(10) Patent No.: US 11,458,933 B2
(45) Date of Patent: Oct. 4, 2022

(54) CLEANING DEVICE INTENDED FOR SPRAYING AT LEAST ONE FLUID ONTO A SURFACE TO BE CLEANED OF A MOTOR VEHICLE

(71) Applicant: Valeo Systèmes d'Essuyage, Le Mesnil Saint Denis (FR)

(72) Inventors: Giuseppe Grasso, Issoire (FR); Grégory Kolanowski, Issoire (FR); Philippe Picot, Issoire (FR); Marcel Trebouet, Le Mesnil Saint Denis (FR); Jordan Vieille, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 116 days.

(21) Appl. No.: 16/337,792

(22) PCT Filed: Aug. 7, 2017

(86) PCT No.: PCT/EP2017/069961
§ 371 (c)(1),
(2) Date: Mar. 28, 2019

(87) PCT Pub. No.: WO2018/059806
PCT Pub. Date: Apr. 5, 2018

(65) Prior Publication Data
US 2020/0001834 A1    Jan. 2, 2020

(30) Foreign Application Priority Data

Sep. 28, 2016    (FR) ........................................ 1659157

(51) Int. Cl.
*B60S 1/56*    (2006.01)
*B60S 1/52*    (2006.01)

(52) U.S. Cl.
CPC ................. *B60S 1/528* (2013.01); *B60S 1/56* (2013.01)

(58) Field of Classification Search
CPC ....... G02B 27/006; B08B 3/02; B60S 1/0848; B60S 1/0862; B60S 1/52; B60S 1/528; B60S 1/56; B60S 1/62
See application file for complete search history.

(56) References Cited

U.S. PATENT DOCUMENTS

2005/0121539 A1    6/2005    Takada et al.
2008/0142619 A1    6/2008    Kim
(Continued)

FOREIGN PATENT DOCUMENTS

FR    2704497 A1    11/1994
GB    2267215 A  * 12/1993 ............. B05B 15/10
(Continued)

OTHER PUBLICATIONS

Machine Translation of Saito, JP 2016078688, May 2016. (Year: 2016).*
(Continued)

*Primary Examiner* — David G Cormier
(74) *Attorney, Agent, or Firm* — Osha Bergman Watanabe & Burton LLP

(57) ABSTRACT

The invention relates to a cleaning device intended for spraying at least one fluid onto a surface to be cleaned of a motor vehicle, such as an optical sensor of an optical detection system, which comprises at least one conveyor body (8) inside of which a distribution duct (11) is arranged and which includes, at the terminal distribution portion (36) thereof, a fluid distribution element (9) in which at least one cleaning fluid spray nozzle (10) is formed, the distribution element (9) including a distribution channel (12) in fluid connection with the distribution duct (11) arranged in the (Continued)

conveyor body (8) and with the spray nozzle (10). According to the invention, the cleaning fluid distribution element (9) is made up of two portions (16, 17): a first portion (16) including a base (16a) of the distribution element (9) attached to the conveyor body (8) and a second portion (17) including a cover (17a) urged against the first portion (16).

16 Claims, 4 Drawing Sheets

(56) References Cited

U.S. PATENT DOCUMENTS

| | | | | |
|---|---|---|---|---|
| 2013/0240569 | A1* | 9/2013 | Hamza | B60S 1/528 222/321.1 |
| 2015/0040953 | A1 | 2/2015 | Kikuta et al. | |
| 2016/0272163 | A1* | 9/2016 | Dreiocker | H04N 5/2257 |
| 2016/0339875 | A1* | 11/2016 | Ina | B60S 1/522 |
| 2018/0021792 | A1* | 1/2018 | López | B05B 1/1672 239/456 |
| 2018/0201232 | A1* | 7/2018 | Ringler | G02B 27/0006 |

FOREIGN PATENT DOCUMENTS

| | | |
|---|---|---|
| JP | 2005-178569 A | 7/2005 |
| JP | 2013018404 A | 1/2013 |
| JP | 2015-057338 A | 3/2015 |
| JP | 2016-078688 A | 5/2016 |
| WO | 2017/045682 A1 | 3/2017 |

OTHER PUBLICATIONS

International Search Report and Written Opinion issued in corresponding International Patent Application No. PCT/EP2017/069961, dated Oct. 12, 2017 (14 pages).

Notification of Reason for Rejection in corresponding Japanese Application No. 2019-516675, dated Apr. 9, 2021 (5 pages).

* cited by examiner

CLEANING DEVICE INTENDED FOR SPRAYING AT LEAST ONE FLUID ONTO A SURFACE TO BE CLEANED OF A MOTOR VEHICLE

The present invention concerns the field of driving aids, and more particularly optical detection systems used for this purpose. The invention concerns more particularly cleaning devices configured for cleaning an optical sensor of such an optical detection system.

An optical detection system is any system comprising optical sensors such as cameras, laser sensors or other sensors based on the emission and/or detection of light in the spectrum visible or invisible to humans, in particular the infrared.

Such optical detection systems are used in ever increasing numbers of motor vehicles in order to aid the driver of the vehicle in certain driving situations, one well-known example of which is parking assistance. For this assistance to be as effective as possible, the data supplied by the optical detection device must be of the highest possible quality, and it is therefore essential to provide clean optics in order to acquire these data. To achieve this, a cleaning device for a sensor of the optical detection device (for example, the external optical surface of an imaging camera) is arranged close to the optical detection device in order to be able to spray a cleaning fluid onto said sensor, on request, just before the detection is performed (for example, image recording).

Such a cleaning device comprises in particular a cleaning fluid routing body, through which the cleaning fluid is able to circulate from a fluid storage tank to a distribution element which is fixed to the end of the routing body and carries spray nozzles. The fluid is ejected from the device via these spray nozzles towards the optical sensor to be cleaned.

In order to optimize cleaning, in particular an optimal position of the spray nozzles relative to the optical sensor is desired, so that the fluid sprayed onto the sensor has the best possible impact angle, and an arrangement of internal conduits in the distribution element is desired which allows the circulation of fluid without load loss in order to promote pressurized ejection of this fluid towards the optical sensor.

Conventionally, distribution elements arranged in the axial extension of the routing body are known, with a distribution conduit which is axially hollowed out in the distribution channel and arranged parallel to the distribution channel formed inside the routing body. Distribution openings are made from the outside of the distribution element to the inner distribution conduit such that the fluid can emerge via these distribution openings.

The invention aims to propose an alternative to the known designs of distribution elements, and more particularly a cleaning device which is intended to spray at least one fluid towards a surface to be cleaned of a motor vehicle, such as an optical sensor of an optical detection system, wherein the cleaning device comprises at least one routing body which houses a distribution conduit and which contains, at its terminal distribution part, a fluid distribution element in which at least one cleaning fluid spray nozzle is formed, the distribution element comprising a distribution channel which fluidically connects the distribution conduit arranged in the routing body and the spray nozzle.

According to the invention, the cleaning fluid distribution element is formed in two parts, a first part comprising a base of the distribution element attached to the routing body, and a second part comprising a cover and pressed against the first part.

Pressing the one of the first and second parts of the cleaning fluid distribution element against the other, with at least one of the first and second parts having a recess on its face in contact with the other part, allows the formation of the distribution channel. The pressing of this recess provided in one part against a flat face of the other part contributes to forming the cleaning fluid distribution channel.

It may also be provided that each of the first and second parts of the distribution element forms part of the distribution channel by means of a recess provided in the respective contact face, said recesses being arranged so as to face each other. Because the one of these parts is pressed against the other at the contact faces in which these recesses are arranged, the two recesses are brought to face each other in order to form the distribution channel. The recess forming the channel in the cover and the second part is complementary to the recess forming the channel in the base and the first part.

According to various characteristics of the invention taken alone or in combination, it may be provided that:
  the at least one spray nozzle comprises a ramp formed protruding from the contact face of the cover of the distribution element;
  the ramp is inclined relative to the extension axis of the distribution channel by an angle of between 20° and 80°, in particular between 30° and 60°, in particular between 40° and 50°; more particularly, this angle may be equal or substantially equal to 45°, wherein it is understood that the term "substantially equal to 45°" includes for example a value of 42.5°;
  the ramp extends in particular protruding from the closing plate by at least the height and width of the distribution orifice;
  the at least one spray nozzle comprises an outlet conduit arranged in the extension of the distribution channel;
  the outlet conduit is formed at least partly, in some cases totally, in the thickness of the base or the cover;
  the outlet conduit extends along an axis which is inclined by an angle ($\beta$) of between 20° and 80°, in particular between 30° and 60°, in particular between 40° and 50° relative to the extension axis of the distribution channel which it extends; in particular, it may be provided that the outlet conduit has an angle equal or substantially equal to 45° with the distribution channel;
  the outlet conduit is arranged parallel to the distribution channel;
  the cross-section of the outlet conduit is smaller than the cross-section of the distribution channel, the cross-section of each of the conduits being defined in a plane perpendicular to the flow direction of the fluid through these conduits;
  the distribution element comprises, at its free end, at least one distribution orifice of rectangular, square, round, oval or half-moon-shaped cross-section. Other shapes may nonetheless be considered without leaving the scope of the invention;
  the routing body extends in a longitudinal extension axis, and the distribution channel extends in a direction which is substantially perpendicular to said longitudinal extension axis;
  the fluid distribution element has a bent form;
  the distribution channel extends from a proximal end in fluidic connection with the distribution conduit of the routing body, to a distal end in fluidic connection with the spray nozzle(s);
  the distribution element is arranged at the end of the fluid routing body such that the proximal end of the distribution channel is arranged level with the distribution conduit provided in the routing body;

the proximal end of the distribution channel has a guide slope for the fluid arriving from the distribution channel arranged in the routing body;

the slope is formed in the recess arranged in the cover; the term "slope" also includes an inclined plane forming a regular ramp, for example at 45° relative to the extension axis of the distribution channel and hence relative to the fluid inflow direction into the distribution element, as well as a curved form: these two examples, given merely indicatively, allow limitation of the load loss on arrival of the pressurized fluid against the part forming the cover of the distribution element, by guiding the cleaning fluid up to the spray nozzle.

According to a characteristic of the invention, the first and second parts of the distribution element are glued or welded together, in particular by ultrasound or by laser.

According to a further characteristic of the invention, the distribution element is arranged substantially perpendicularly to the fluid routing element.

Further characteristics, details and advantages of the invention and its function will appear more clearly from reading the description below, which is given merely indicatively, in connection with the attached figures in which.

It should firstly be noted that, although the figures present the invention in detail for its implementation, they may naturally also serve to better define the invention where applicable. It is also understood that the embodiment of the invention illustrated by the figures is given as a non-limitative example.

It is furthermore recalled that in the description below, the terms "upstream" and "downstream" relate to the flow direction of the cleaning fluid in the cleaning device according to the invention of the optical sensor detection assembly. Thus the term "upstream" refers to the side of the cleaning device via which the cleaning fluid is introduced therein, and the term "downstream" refers to the side of the cleaning device through which the cleaning fluid is distributed to the exterior, towards a surface of an optical sensor of an optical detection assembly of a motor vehicle.

Figure 1:
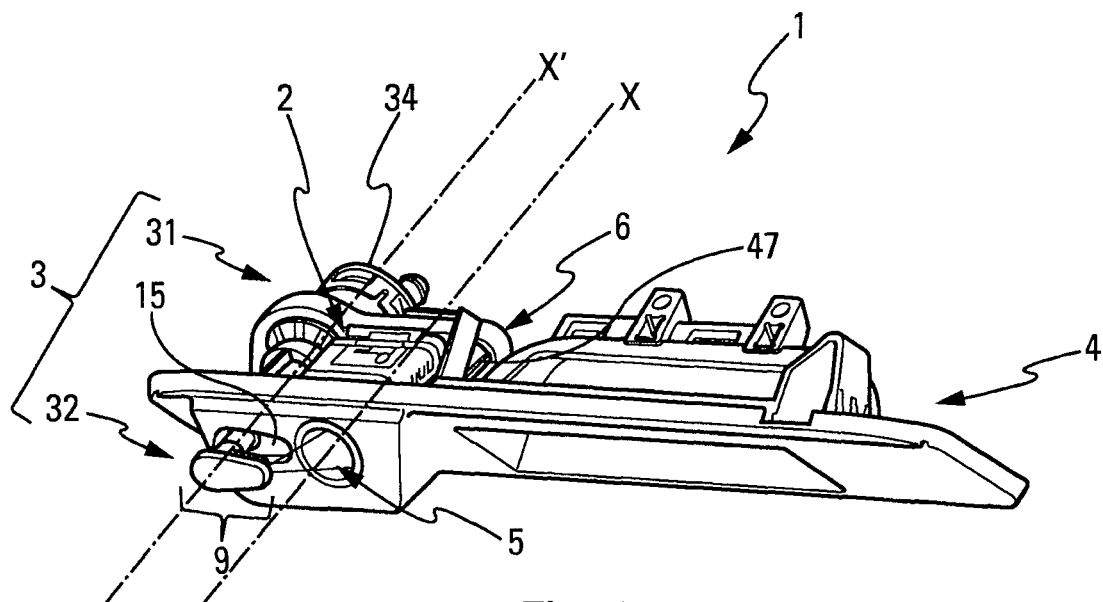
FIG. 1 is a perspective view of a detection assembly for a motor vehicle, comprising an optical detection device and a cleaning device according to the invention, here arranged in parallel, the cleaning device being in its deployed position for spraying fluid onto the detection device.
Figure 8:
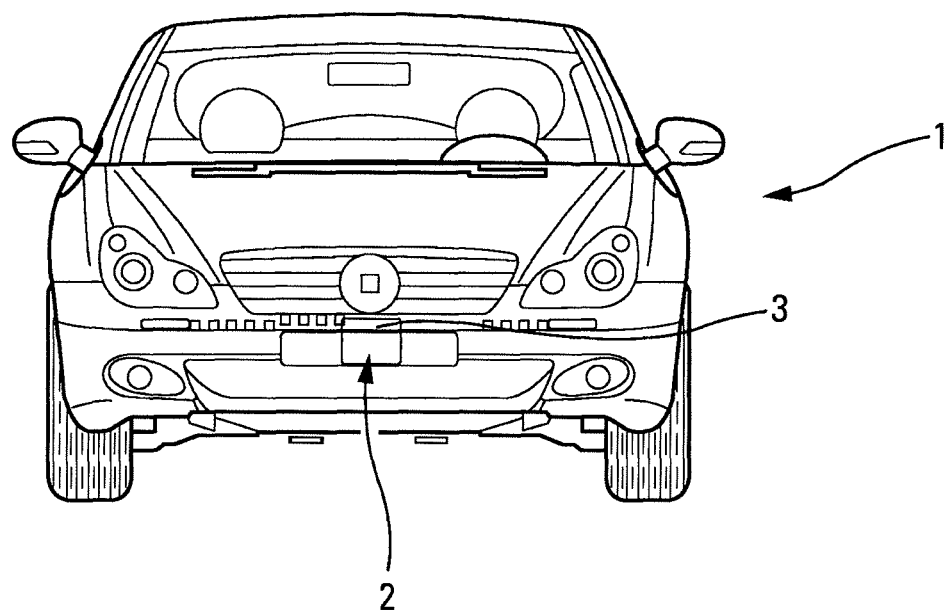
FIG. 8 is a front view of a motor vehicle, the front face of which is equipped with an optical detection system and an associated cleaning device according to the invention.

FIG. 1 illustrates an optical sensor detection assembly 1 for a motor vehicle, comprising at least one optical detection device 2 equipped with an optical sensor 5, preferably a camera, and a cleaning device 3 for the optical sensor 5. The two devices are mounted in housings formed in a common casing 4 which is specifically dedicated to this. FIG. 8 shows a view of a motor vehicle on which such an optical sensor detection assembly 1 is installed, in particular here in the front face.

In the example illustrated, the optical detection device 2 and the cleaning device 3 extend longitudinally along two substantially parallel extension axes, respectively (X) and (X'). The extension axis (X) of the optical detection device 2 here corresponds to the optical axis of the optical sensor 5, and the extension axis (X') of the cleaning device 3 here—in the case of a telescopic cleaning device—corresponds to the deployment axis of the telescopic element of the cleaning device. FIG. 1 illustrates a cleaning phase during which the telescopic element of the cleaning device 3 is in the deployed position, such that a distribution element 9 carried at its free end allows cleaning fluid to be sprayed onto the optical sensor 5.

The optical detection device 2 and the cleaning device 3 are mounted on the common casing 4 via an intermediate support element 6, which comprises receiving means for each of the devices and means allowing their fixing to the common casing.

Figure 2:
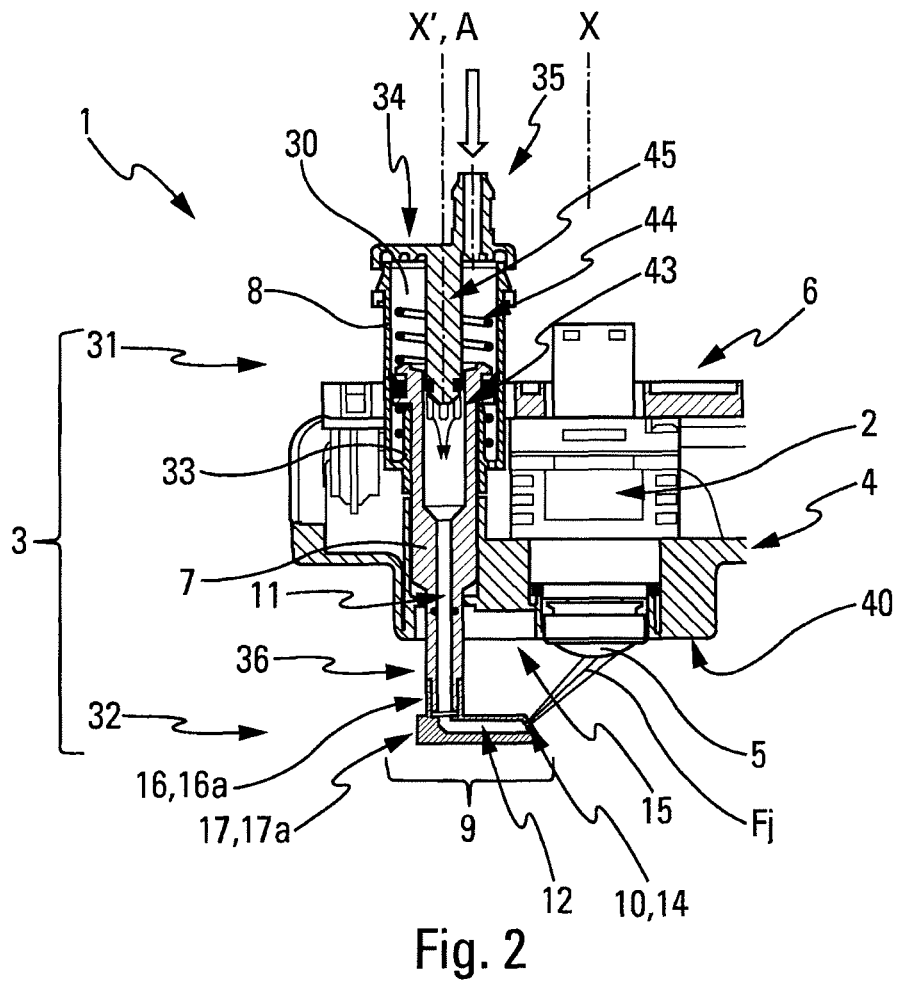
FIG. 2 is a cross-sectional view of the detection assembly from FIG. 1, in a section plane containing the extension axes of the optical detection and cleaning devices.
Figure 3:
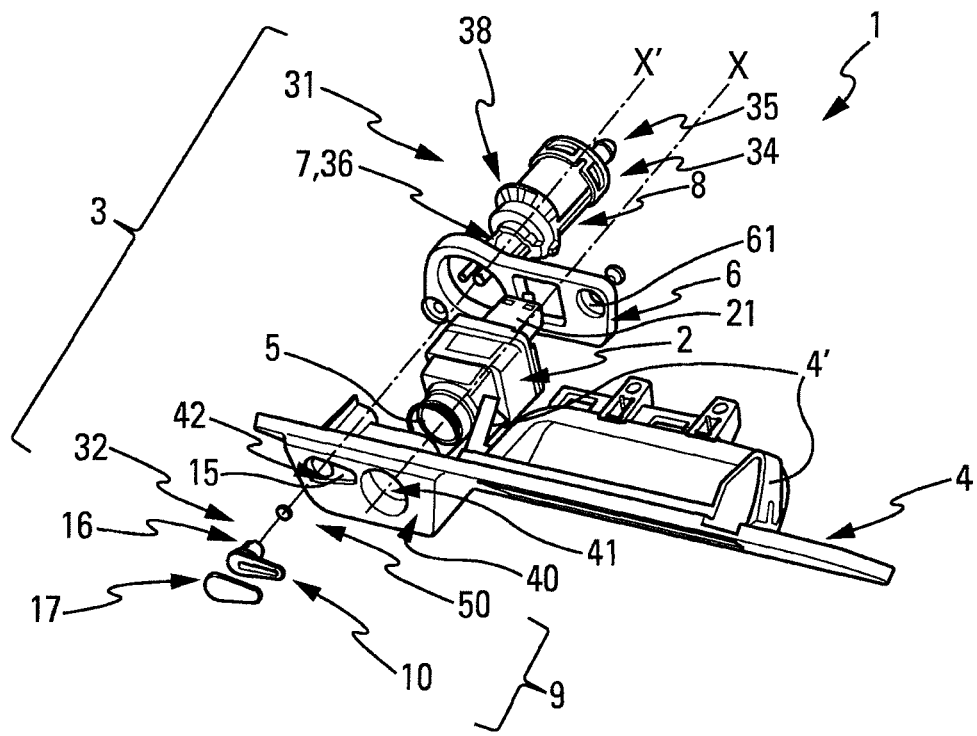
FIG. 3 is an exploded view of the detection assembly from FIG. 1 from the same perspective angle, and illustrates in particular the two-part form of the distribution element which is arranged in the terminal part of the cleaning device.

With reference in particular to FIGS. 1 and 2, the constituent elements of the detection assembly 1 will now be described in more detail.

The telescopic cleaning device 3 has an upstream part 31 comprising at least one routing body 8, formed from at least one hollow body inside which a piston 7 can be moved between a retracted position and a deployed position (shown on FIGS. 1 and 2), thus forming the telescopic element of the cleaning device, and a downstream part 32 comprising at least the distribution element 9.

In the upstream part 31, the hollow body 8 has a form generated by revolution around the longitudinal axis (X'), wherein it is closed at one end by an inlet flange 34 and at the opposite end has a sleeve 33 within which the piston 7 is able to slide. A fluid intake ferrule 35 is formed protruding from the inlet flange 34 eccentrically relative to the longitudinal axis (X'). The constituent elements of this upstream part 31 will be described in more detail below, in particular the means allowing movement of the piston 7 from an extreme rest position to an extreme deployed position, but it should be noted firstly that the fluid routing body comprises in particular a terminal distribution part 36 arranged opposite the intake ferrule 35. This terminal distribution part 36 is pierced so as to form a distribution conduit 11, via which the cleaning fluid flows towards the downstream part 32 of the cleaning device and in particular the distribution element 9, in order to be sprayed onto the optical sensor.

In the downstream part 32, the distribution element 9 is fixed at the free end of the terminal distribution part 36 and comprises at least one spray nozzle 10 for cleaning fluid, and a distribution channel 12 fluidically connecting the distribution conduit 11 of the piston 7 and the spray nozzle 10, as can be seen in particular on FIG. 2.

In the case illustrated, in order to simplify mounting of the assembly, firstly the routing body 8 may be installed on the common casing shared with the optical detection system, then the fluid distribution element may be fixed by elastic clip fixing to the terminal distribution part 36 of the piston 7 which protrudes through an opening formed in the casing.

Figure 4:
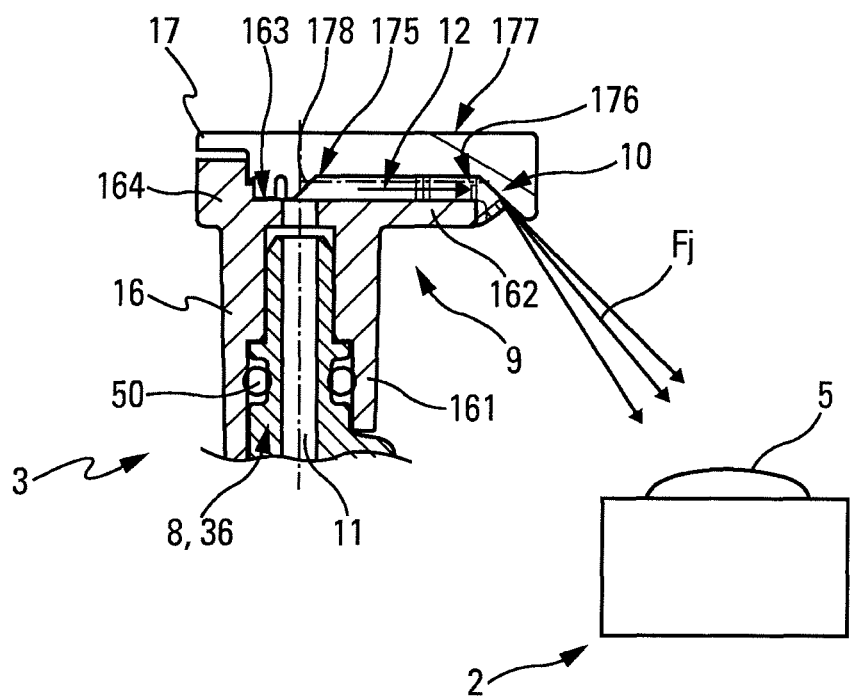
FIG. 4 is a cross-sectional view of the terminal part of the cleaning device, and illustrates more particularly a two-part distribution element according to the principle of the invention, which is configured to allow the ejection of cleaning fluid onto an optical sensor.

FIG. 4 illustrates the downstream part 32 of the cleaning device 3. The figure illustrates more particularly the distribution element 9, in particular of bent form and able to be fixed, for example by elastic clip fixing, to the terminal distribution part 36 of the piston 7, in order to fluidically connect the distribution conduit 11 of the piston 7 to the distribution channel 12. The connection of the distribution element 9 to the terminal distribution part 36 of the piston 7 is sealed by the presence of an O-ring 50.

The distribution element 9, in particular because of its bent form, extends in a direction which is substantially perpendicular to the longitudinal extension axis of the fluid routing body 8. It is understood that the distribution channel provided inside the distribution element also extends perpendicularly to this longitudinal extension axis.

The common casing 4 has a zone for fixing to the structure of the vehicle, comprising in particular one or more fixing elements 4', and a zone for receiving the detection device 2 and cleaning device 3.

This receiving zone in particular has a front face 40 which is turned towards the outside of the vehicle when the common casing 4 is mounted on the structure of the vehicle, and onto which two bores open: namely a first bore forming a receiving housing 41 for the optical sensor 5, and a second bore forming a passage housing 42 which is dimensioned so as to allow passage of the piston 7. In the embodiment shown here, these housings are substantially circular and have different diameters.

Also, on said front face 40, the common casing 4 has a cavity 15 arranged around the second bore 42, the shape and dimensions of which are slightly larger than those of the distribution element 9, so as to form a receiving cavity for this distribution element 9 when the movable piston 7 is in the rest position. It is thus possible to fully retract the distribution element 9 into the common casing 4 when the cleaning device 3 is not operational, and hence to avoid hindering the acquisition of data by the detection device 2. This is made possible in particular because of the bent shape and hence the substantially parallel arrangement of the distribution element 9 with the front face 40 of the common casing, which allows formation of a recess of constant thickness equal to the thickness of the distribution element 9 in order to form the cavity 15.

FIG. 2 illustrates the detection assembly 1 of the invention in the cleaning phase, during which the movable piston 7 and hence the distribution element 9 carried at its free end are in the deployed position such that the distribution element is able to spray fluid onto the optical sensor 5.

Arrows illustrate the path of the cleaning fluid introduced into the cleaning device 3 via the intake ferrule 35. The fluid is thus conveyed into an intake chamber 30 which is delimited laterally by the hollow body and axially by the inlet flange and by the movable piston. It is understood that the dimensions of the inlet chamber vary according to the movement of the movable piston in the hollow body. The pressure exerted by the cleaning fluid pushes the piston 7 into the hollow body, opposite the inlet flange 34, towards its deployed position. The inlet flange 34 comprises a rod 45 which extends substantially perpendicularly to the interior of the hollow body, and along which the movable piston 7 is guided so as to slide between the retracted end position and the deployed end position, the movable piston having an inner wall arranged facing the rod 45. In this embodiment, passage channels 43 are provided in the upper upstream part of the piston 7 so as to open onto the intake chamber 30, such that the cleaning fluid is able to pass between the rod 45 and the inner wall of the piston 7 when the position of the piston relative to the rod allows. In this position, illustrated on FIG. 2, in which the downstream end of the passage channels is open, the cleaning fluid enters the distribution conduit 11 provided in the piston and the terminal distribution part 36 in order then to enter the distribution element 9. An elastic return means 44, here a compression spring, is arranged in the hollow body to return the piston to the retracted end position when the pressure exerted by the cleaning fluid is insufficient.

The piston 7 is movable along a longitudinal axis (A) which is parallel to the extension axis (X) of the optical detection device 2 and substantially identical to the extension axis (X').

As illustrated in particular on FIG. 4, the distribution element 9 of bent form is attached to the terminal distribution part 36 of the piston 7, and extends in a direction which is substantially perpendicular to the longitudinal axis (A), such that the spray nozzle(s) 10 arranged at the free end of the distribution element 9 is(are) directly adjacent to a peripheral zone of the optical sensor 5.

In other words, the bent form of the distribution element 9 allows the spray nozzle(s) to be arranged between the extension axis (X') of the cleaning device and the extension axis (X) of the detection device; in the context of the arrangement of a cleaning device parallel to the detection device, this allows the spray nozzle 10 to be moved closer to the optical sensor 5 to be cleaned.

The distribution element 9 is formed from two separate parts, namely a first part 16 comprising at least one base 16a and a second part 17 comprising at least one cover 17a, wherein these two parts are able to define between them a distribution channel 12 which is fluidically connected to the distribution conduit 11 of the piston 7 and to the spray nozzle 10. The latter may be provided in the base 16a or in the cover 17a, or formed at the junction of these two parts.

The channel is obtained by the formation of a recess in at least one of these two parts and by pressing the one of the two parts against the other.

FIGS. 4 to 7 illustrate the distribution element 9 in more detail in several variant embodiments, in each of which said distribution element is formed from two separate parts.

A first part 16 comprises a base 16a of the distribution element which is fixed to the fluid routing body 8 of the cleaning device, and more particularly connected to the terminal distribution part 36 of the piston 7. A second part 17 comprises a cover 17a which comes to cover the first part. The distribution element is formed by pressing the first and second parts against each other, in particular at their free end faces brought into contact with each other, and by fixing the one to the other. In particular, the cover may be glued to the base, or the parts may be joined by elastic deformation means. In a particular embodiment, a sealed fixing may be provided, which prevents leakage of the fluid intended to circulate in the distribution channel 12, wherein the two parts are welded to each other, in particular by an ultrasound welding process or by a laser welding process.

In cross-section in a plane perpendicular to the longitudinal extension axis of the cleaning device, the two parts of the distribution element 8 have respective peripheries which are able to cooperate in regard to shape and dimensions.

The base 16a of the example illustrated comprises a fixing portion 161 in the form of a cylindrical shank with a cross-sectional form which is complementary to that of the terminal distribution part 36, and a support portion 162 which is configured to receive the cover 17a on its free end face 163 opposite the fixing portion 161. The support portion 162 may comprise peripheral edges 164 delimiting a central cavity for receiving part of the cover 17a.

In the example illustrated on FIG. 4, in the center of the central receiving cavity, the free end face 163 has a flat contact face into which the distribution conduit 11 opens.

Figure 5:
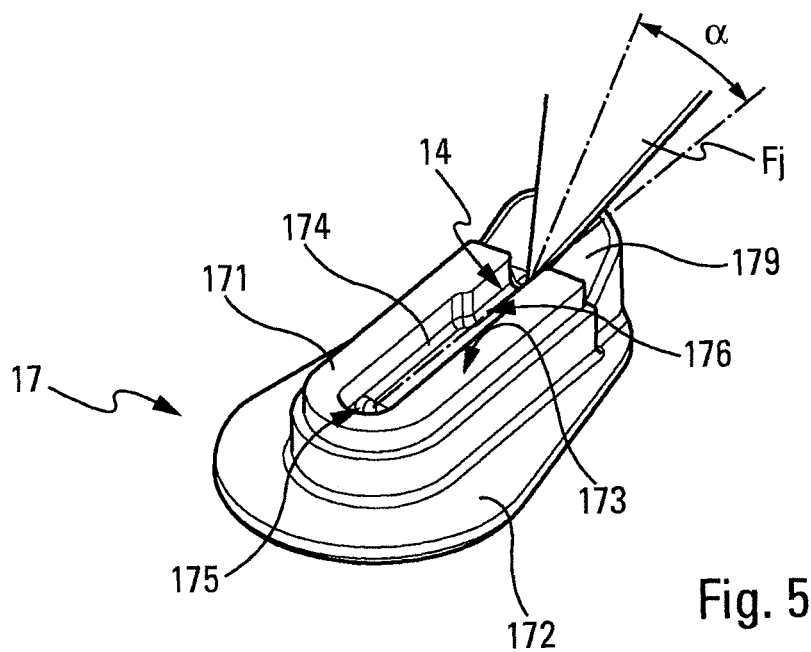
FIG. 5 is a perspective view of one of the parts of the distribution element, in particular the cover, and shows the inner face of said cover, namely the face intended to be brought into contact with the other part of the distribution element.

The cover 17a, visible in particular on FIG. 5, comprises a sleeve 171 and the closing plate 172 forming a collar which radially extends one end of the sleeve.

The sleeve is dimensioned such that it can be housed in the receiving cavity formed in the base 16a around the inlet of the distribution conduit. The sleeve 171 has a free end face 173 arranged to be in contact with the free end face 163 of the base 16a.

A recess 174 is provided in the cover 17a, here at the level of the sleeve 171, on the free end face 173. This recess 174 extends from a proximal end 175, arranged in the thickness of the cover, to a distal end 176 forming part of the spray nozzle(s) 10. When the distribution element is assembled and fixed on the fluid routing body of the cleaning device, the distribution conduit provided in the piston 7, or at least in the downstream part of the distribution device, opens into this first recess 174 at the proximal end 175, and this recess extends substantially perpendicularly to the distribution conduit 11.

The closing plate 172 has an outer face 177 which is turned towards the outside of the vehicle when the device is in position on the vehicle. This outer face may have either a flat or a curved form.

According to the invention, the free end face 173 of the cover—here the inner face of the sleeve—is placed against the free end face 163 of the base such that at least one recess, here formed in the inner face of the cover, forms the distribution channel 12 when covered by the contact face of the other part, here the base.

The recess 174, which contributes to the formation of the distribution channel, is produced by removal of material from the free end face of the cover 17a, or by a molding process which is simplified because the recess is open on the free end face 173 of the cover.

At the level of the fluid inlet, i.e. at its proximal end 175, the recess 174 has a guide slope 178 able to limit the load loss on inflow of the pressurized fluid into the distribution element 9 against the cover 17a, and to accompany said fluid up to the distal end 176 of the distribution channel 12, towards the spray nozzle 10.

This guide slope 178 may have the form of a ramp or inclined plane as shown on FIG. 4, or may have the form of a curved surface, for example with parabolic section.

At the distal end 176 of the recess 174, the at least one spray nozzle 10 comprises an outlet conduit 14 arranged in the extension of the recess which contributes to the formation of the distribution channel 12.

In order to increase the outlet flow speed of the fluid, it is possible to vary the cross-section of the passage between the outlet conduit 14 and the rest of the distribution channel 12, situated upstream of the outlet conduit relative to the fluid flow direction. More particularly, the cross-section at the level of the outlet conduit is smaller than the cross-section in the middle of the distribution channel. It is understood that for a constant cleaning fluid flow, the reduction of these cross-sections will increase the speed of the fluid in the distribution element, and hence increase the diffusion of the fluid jet Fj, illustrated on FIGS. 4 and 5, and its impact on the optical sensor 5 of the detection system. Thus the cleaning performance is improved.

As a non-limitative example, it may in particular be provided that the cross-section of the distribution channel 12 between the proximal end and the distal end has substantially a width of 2.2 mm and a depth of 1.4 mm, and the cross-section of the outlet conduit 14 has substantially a width of 1.4 mm and a depth of 1.4 mm.

At its free end, the distribution element comprises a distribution orifice 13 of rectangular cross-section. In other words, the outlet conduit 14 opens at the free end of the distribution element to form this distribution orifice 13 of rectangular cross-section, and for example of square cross-section in the example described above.

The jet leaving the distribution orifice 13 is diffused at the edges of the rectangular cross-section of the outlet conduit. These edges allow the spread of the cleaning fluid jet to be directed, and a segmented jet may be formed known as a bar shape.

Also, the spray nozzle 10 is configured such that the fluid may be ejected with a defined angle. More particularly, it may be provided that the outlet conduit extends along an axis which is inclined by an angle β of between 20° and 80°, in particular between 30° and 60°, in particular between 40° and 50°, or in some cases equal or substantially equal to 45°, and—as a more precise but not limitative example—equal to 42.5°, relative to the extension axis of the distribution channel which it extends. Thus it may be ensured that the cleaning fluid hits the optical sensor at an angle relative to the optical axis, in particular also an angle substantially equal to 45°, which offers good cleaning conditions.

FIGS. 4 and 5 illustrate embodiments of the spray nozzle 10 which comprises in particular a ramp 179 forming an inclined surface and arranged opposite the distribution orifice 13. The ramp 179 thus forms an obstacle to the circulation of the fluid, in order to disrupt and divert the fluid jet so as to create a deflected jet diffusion of the jet Fj. Because of the orientation of the inclined surface arranged transversely to the fluid circulation, it is possible to guarantee, on production, an angular precision controlled by production tolerances, and hence a perfectly controlled orientation of the jet onto the optical sensor.

The ramp 179 may be produced in particular by a protrusion which is formed projecting from the contact face of the cover 17a, here the closing plate 172, and protrudes from this plate at least over the height or depth of the recess 174 formed in the cover 17a.

The ramp extends in particular protruding from the second part 17 by at least the height, in some cases at least the height and width, of the distribution orifice 13.

As an example, the ramp may be inclined relative to the extension axis of the distribution channel by an angle α of between 20° and 80°, in particular between 30° and 60°, in particular between 40° and 50°, and in some cases equal or substantially equal to 45°.

The principle of the cleaning system for the laser sensor is as follows, once the cleaning fluid has entered the distribution channel 12 of the distribution element 9 via the fluid routing body 8 and the distribution conduit 11. The straight jet of fluid in the outlet conduit 14 comes into contact with an inclined surface which is set at a defined inclination angle in order to diffuse the cleaning fluid jet and thus create a spray covering the surface of the outer optical surface of the camera, in particular in some cases by the telescopic sweeping of the cleaning device.

Figure 6:
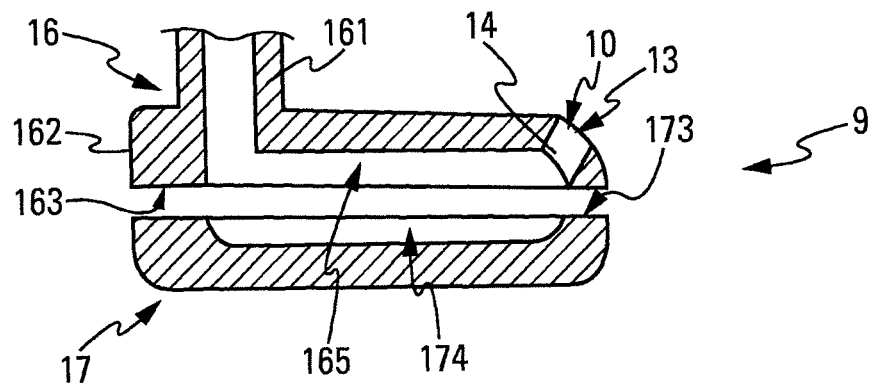
FIGS. 6 and 7 are cross-sectional views of the distribution element of the cleaning device, respectively before and after assembly of the two parts forming the base and the cover.
Figure 7:
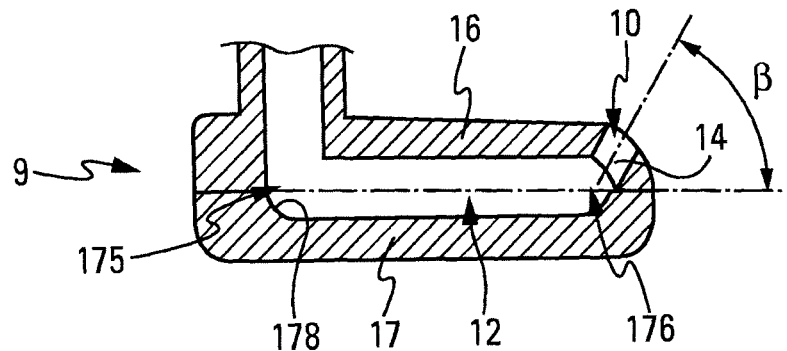

FIGS. 6 and 7 illustrate a second variant embodiment of the two-part distribution element according to the invention.

In this variant, two recesses are produced, one in each part 16, 17 of the distribution element 9, to form the distribution channel 12.

A first recess 165 is arranged in the base 16a and a second recess 174 is arranged in the cover 17a, and—as before—the distribution channel is formed when the two parts are pressed against each other at their respective contact faces, namely the free end faces 163 and 173. The two recesses have length and width dimensions which are substantially equivalent, wherein it is understood that the depth, i.e. the dimension in the perpendicular direction, at the free end faces of the two parts in mutual contact may vary from one recess to the other.

The distribution channel 12 is extended as before by an outlet conduit 14 which, in this example, extends along an inclined axis, which is in particular inclined by an angle substantially equal to 45°, relative to the extension axis of the distribution channel 12. In this variant, the inclination of the fluid jet hitting the optical sensor is obtained by the inclined arrangement of the outlet conduit 14.

The outlet conduit is thus formed by an oblique bore produced substantially in the base 16a of the distribution element.

It should be noted that the invention is not limited to merely the embodiments of the cleaning device distribution element explicitly described above. As a non-limitative example of a variant, in particular the shape of the parts constituting the distribution element and/or the shape of the recesses forming the distribution channel may be modified, wherein the distribution element comprises a plurality of constituent parts, assembly of which contributes to form the distribution channel. For reasons of simplification of assembly or for aesthetic reasons, the two parts of the distribution element may present, in cross-section in a plane perpendicular to the longitudinal extension axis of the cleaning device, respective peripheries of equivalent shape and dimensions.

The invention claimed is:

1. A cleaning device for spraying at least one fluid onto a surface to be cleaned of a motor vehicle, the cleaning device comprising:
    an intermediate support element configured to receive and fix the cleaning device and an optical detection device to a common casing such that the cleaning device and the optical detection device extend along separate parallel axes,
    at least one fluid routing body which houses a distribution conduit and comprises, at a terminal distribution part:
        a fluid distribution element in which at least one cleaning fluid spray nozzle is formed, the fluid distribution element comprising a distribution channel fluidly connected to the distribution conduit arranged in the at least one fluid routing body and to the at least one cleaning fluid spray nozzle, and
        a piston configured to actuate the fluid distribution element from a first position to a second position, and
    an inlet flange comprising:
        a rod that extends parallel to the piston and is configured to guide the piston during actuation, and
        an intake ferrule that is configured to introduce cleaning fluid into the cleaning device,
    wherein the fluid distribution element comprises two parts, a first part that comprises a base of the distribution element attached to the at least one fluid routing body, and a second part that comprises a cover that is pressed against the first part, and
    wherein the piston comprises an inner wall arranged facing the rod such that cleaning fluid passes in a space between the rod and the inner wall of the piston.

2. The cleaning device as claimed in claim 1, wherein the distribution channel is formed by pressing the first and second parts of the fluid distribution element against each other, and
    wherein the first part and second part have a recess on a respective contact face.

3. The cleaning device as claimed in claim 2, wherein each of the first part and second part of the distribution element forms part of the distribution channel by a recess provided in their respective contact face, said recesses being arranged so as to face each other.

4. The cleaning device as claimed in claim 2, wherein the first part and the second part of the distribution element are assembled against one other with their respective contact faces pressed against each other,
    wherein one of the first part and the second part has a contact face in which a recess is arranged, and
    wherein another of the first part and the second part has a flat contact face.

5. The cleaning device as claimed in claim 1, wherein a first spray nozzle comprises a ramp formed protruding from a contact face of the cover of the distribution element.

6. The cleaning device as claimed in claim 5, wherein the ramp is inclined relative to an extension axis of the distribution channel by an angle between 40° and 50°.

7. The cleaning device as claimed in claim 1, wherein a first spray nozzle comprises an outlet conduit arranged in an extension of the distribution channel.

8. The cleaning device as claimed in claim 7, wherein the outlet conduit is formed at least partly in a thickness of the base or of the cover.

9. The cleaning device as claimed in claim 7, wherein the outlet conduit extends along an axis which is inclined by an angle of between 40° and 50°, relative to an extension axis of the distribution channel in which the distribution channel extends.

10. The cleaning device as claimed in claim 7, wherein a cross-sectional area of the outlet conduit is smaller than a cross-sectional area of the distribution channel.

11. The cleaning device as claimed in claim 1, wherein the distribution element comprises, at a free end, a distribution orifice of rectangular, square, round, or oval shaped cross-section.

12. The cleaning device as claimed in claim 1, wherein the at least one fluid routing body extends in a longitudinal extension axis, and the distribution channel extends in a direction which is substantially perpendicular to the longitudinal extension axis.

13. The cleaning device as claimed in claim 1, wherein the fluid distribution element has a bent form.

14. The cleaning device as claimed in claim 13, wherein a proximal end of the distribution element has a guide slope for a fluid arriving from the distribution conduit arranged in the at least one fluid routing body.

15. The cleaning device as claimed in claim 14, wherein the guide slope is formed in a recess arranged in the cover.

16. The cleaning device as claimed in claim 1, wherein the first part and the second part are rigidly attached to each other.

* * * * *